| United States Patent Office | 3,075,935 |
|---|---|
| | Patented Jan. 29, 1963 |

3,075,935
COATING COMPOSITIONS OF AQUEOUS VINYL ACETATE POLYMER EMULSIONS MODIFIED WITH KETONE-ALDEHYDE RESINS
Robert V. De Shay, East Longmeadow, Mass., assignor to Shawinigan Resins Corporation, Springfield, Mass., a corporation of Massachusetts
No Drawing. Filed Dec. 17, 1959, Ser. No. 860,095
5 Claims. (Cl. 260—29.6)

This invention pertains to the preparation of aqueous dispersion type coating compositions having for the resinous binder certain vinyl acetate polymers modified with ketone-aldehyde resins. More particularly, this invention pertains to such compositions wherein the resin binder comprises certain admixtures of the vinyl acetate polymer and the ketone-aldehyde resin, the methods of preparation for these compositions and the particular uses for which such compositions are especially suited, namely, paints and varnishes.

Aqueous emulsions of polyvinyl acetate homopolymers have met with wide acceptance as the binder for aqueous dispersion paints and varnishes. Coating compositions containing these binders, however, have been necessarily modified to overcome various shortcomings of this resin binder. In one method solvents and plasticizers have been added to the aqueous coating composition in order to impart the proper degree of film flexibility and imperviousness. By another method, various copolymers of vinyl acetate have been found useful to impart these and other properties needed for both exterior and interior surface coatings. With all of such modifications, however, it has not been heretofore possible to prepare surface coatings from aqueous dispersions of vinyl acetate polymers having all the desired properties and in addition being classifiable as a "high gloss" coating.

Several approaches to the problem of the preparation of a "high gloss" polyvinyl acetate binder surface coating have been made through the use of additives in the aqueous polyvinyl acetate emulsion systems such as alkali, soluble resins, starch colloids, alkyd resins and/or the addition of large amounts of solvents. Each of these modifiers has resulted in serious shortcomings which will affect either the appearance or the durability of the dried coating. More specifically, the addition of the mentioned agents will result in discoloration both before and/or after exposure, water sensitivity, cracking, flaking, peeling and loss of gloss with aging. These additions will also cause poor brushing and level characteristics of the aqueous system and in some instances its putrefaction during storage. Also, the manufacture of such modified polyvinyl acetate systems is difficult as a result of the incorporation of the named additives. To further illustrate the problem, the addition of an organic liquid solvent to the aqueous coating composition will improve the gloss, adhesion to the substrate and water sensitivity of the dried coating. But the incorporation of the solvent will also soften the dried coating, decrease its blocking resistance and spot resistance and decrease brushability of the liquid coating. The addition of a solvent will also decrease the mechanical stability of the aqueous coating composition.

The applicant has found it possible to obtain a "high gloss" coating composition utilizing a vinyl acetate polymer resin binder, which coating composition will not have the shortcomings above described. The novel coating compositions comprise the admixture of an organic liquid solution of a water-insoluble ketone-aldehyde resin with an aqueous emulsion of a film-forming vinyl acetate polymer comprising the polymerization reaction product of vinyl acetate with a polyoxyalkylene compound, the solution having been added to the emulsion with agitation at temperatures up to 75° C.

That the present compositions can contain relatively large quantities of organic liquid solvents without the undesired results described for the usual vinyl acetate resin binder dispersions containing these solvents, is indeed surprising. Not only has the solvent not decreased desirable film properties when in combination with the vinyl acetate polymers and ketone-aldehyde resins of the present invention, but the improvements obtained were far greater than were expected.

The invention is practiced in its preferred embodiment as illustrated in the following examples and discussions thereon, but is not limited thereto. Where parts and percentages are used hereinafter in the specification and claims they are parts and percentages by weight.

EXAMPLE 1

A typical formulation for an exterior varnish was prepared having the following composition:

| | Parts |
|---|---|
| Aqueous vinyl acetate polymer emulsion (55% total solids) | 48.1 |
| Ketone-aldehyde resin | 28.4 |
| Solvent (glycol ethyl ether) | 13.4 |
| Water | 10.1 |
| | 100.0 |

A solution of the ketone-aldehyde resin was first prepared by adding the solid resin to the solvent at room temperature with suitable mechanical agitation. This resin solution was thereafter added to the vinyl acetate polymer emulsion at room temperature and with continued agitation.

Finally the water was added to the admixture in order to readjust the solids of the coating composition to approximately 55% total solids. The mechanical stability of the aqueous coating composition was excellent.

Approximately .0015 in. wet thickness films were cast on flat glass plates from the above coating composition and air dried at room temperature. Both the wet and dry adhesion of the films to the glass substrate were greater than for the usual modified polyvinyl acetate compositions. The air dried films were clear, colorless and glossy, and further exhibited no loss of gloss after scrubbing with a one half percent by weight soap solution. The light reflectance of the dried films measured 95–100% in contrast to 85–90% for the usual solvent modified polyvinyl acetate dispersion. The Sward hardness measured 54% contrasted with 20% for similar polyvinyl acetate films.

EXAMPLE 2

To illustrate the preparation of paints made from the novel resin compositions of the present invention, an exterior white paint was prepared from the varnish of Example 1 and a pigment slurry having the following composition.

Paint base:
    Varnish (Example 1) _____ 577
    Plasticizer mixture—
        Plasticizer (dibutyl phthalate) _____ 16.6
        Solvent (glycol ethyl ether) _____ 25.0
    Pigment slip-surfactant mixture—
        Water _____ 135.5
        Surfactant (sodium salt of carboxylated polyelectrolyte–25% NVM) _____ 3.4
        Pigment (rutile) _____ 124.5
    Pigment extenders—
        Clay _____ 4.7
        Calcium carbonate _____ 4.7

Paint base, Pigment extenders—Continued
        Defoamer (octyl alcohol) _____ .3
        Thickener mixture (2% NVM aqueous solution of methyl cellulose, 7,000 centipoises__ 87
                                                                    ———
                                                                    978.7

In the preparation of the coating composition the paint base and pigment slip were prepared separately and thereafter admixed by incorporating the paint base into the pigment slip at room temperature with mechanical agitation. The paint base was prepared by first mixing the plasticizer in the organic solvent and thereafter adding the solution formed to the varnish of Example 1. The pigment slip was prepared by first adding the surfactant mixture to the water at room temperature and thereafter adding the pigments and extenders with agitation. Next, this portion of the slip was ground in a Morehouse mill in such a manner so as to obtain a Hegman grind of 6–7. Thereafter the defoamer was added to the ground pigment slip as was the thickener solution.

The paint had a pH of 7.0, a PVC (pigment volume concentration) of 10.5% and an NVM (non-volatile matter) of 48%. The Stormer viscosity of the finished paint was 70 K.U.'s (Krebs units). A comparison of the dried film properties for the above compositions is made with other competitive finishes in Table I below.

*Table I*

| Properties | Aqueous Dispersion Gloss Paint [1] | Oleoresinous Gloss Paint [2] | Example 2 |
|---|---|---|---|
| Odor | Very high | High | Mild. |
| Brushability | Fair | Excellent | Very good. |
| Leveling | do | do | Excellent. |
| Drying | ½ hour | 2–3 hours | ½ hour. |
| 60° Gloss | 85% | 90% | 90%. |
| Contrast ratio (%) | 95% | 98% | 95%. |
| Adhesion | Poor | Excellent | Excellent. |
| Effect of cleaning (with non-abrasive detergent). | Film gets tacky | None | None. |

[1] Resin binder was a mixture of polyvinyl acetate homopolymer and a vinyl acetate-dibutyl maleate copolymer.
[2] Alkyd resin binder.

It will be noted from the above comparison that although both of the commercial paints compared with the present composition have some properties which were as good, neither of the commercial paints possess all of the advantages shown for the present compositions.

The present coating compositions possess excellent mechanical and storage stability, are water thinnable and may be easily applied as a one or two coat system. The dried films obtained therefrom possess excellent adhesion to many substrates including glossy oleoresinous paint surfaces, exhibit little or no loss of gloss on aging or washing of the film. The concentration of the total resinous solids constituting the binder in the present aqueous coating compositions may range from about 30% to about 65% by weight with from about 50% to about 60% preferred. The ratio of vinyl acetate polymer to ketone-aldehyde resin in the resinous binder may be 100 parts vinyl acetate polymer to 3–300 parts ketone-aldehyde resin, with the preferred ratio being 100 parts vinyl acetate polymer to 50–150 parts ketone-aldehyde resin. The concentration of the solvent for the ketone-aldehyde resin employed in the coating composition is based on the total resinous solids and may range from 100 parts solvent to 50–300 parts of the total ketone-aldehyde resin and vinyl acetate polymer.

Suitable vinyl acetate polymer emulsions for the practice of the present invention can be generally characterized as stable, film forming aqueous dispersions of the polymerization reaction product of vinyl acetate and a polyoxyalkylene compound, containing 30 to 60% total solids, with the polymer contained in the emulsion present as individual discrete resinous particles having an average diameter of 0.1–0.4 micron diameter.

These emulsions may best be specifically characterized from the properties of air-dried films obtained from the emulsion, whereby such films possess the combined properties of much greater flexibility, water resistance, clarity and gloss than like films obtained from known vinyl ester polymer emulsions receiving no further treatment.

The vinyl acetate polymers employed in the present coating compositions comprise the polymerization reaction product of 100 parts vinyl acetate with 3–15 parts polyoxyalkylene compound. Polymerization reaction products prepared from 3–10 parts polyoxyalkylene compound and 100 parts of vinyl acetate are preferred as imparting superior water resistance to the dried films obtained from the present aqueous coating compositions.

The suitable emulsions may be prepared by the well known emulsion polymerization of vinyl acetate in the presence of an emulsifier comprising the polyoxyalkylene compound. Suitable polyoxyalkylene compounds can be selected from the class consisting of solid block copolymers of ethylene oxide-propylene oxide and the polyethylene glycols. In turn, the suitable block copolymers may be selected from the general class of reaction products of the hydrophobic base material with ethylene oxide, which reaction products are detergent in nature. A suitable method for the preparation of the block copolymers is taught in U.S. Patents 2,674,619 and 2,677,700. Suitable polyethylene glycol emulsifiers are sold by the Union Carbide Corporation under the trademark "Carbowax."

Suitable polyoxyalkylene compounds may be determined merely by substitution in a polymerization of vinyl acetate by the method hereinafter described. If the resulting emulsion is gritty, comprises beads, is inhibited, or results in the precipitation of the emulsion solids, the particular emulsifier is undesirable. An additional test for the suitability of this particular type polyoxyalkylene emulsifier is the examination of the film cast from the particular test emulsion. If the air-dried film contains fibrous growths resulting in poor film clarity and gloss then the particular emulsifier is unsuitable. The minimum gloss of the air-dried film for the compositions of the present invention is a reflectance of 85%, measured by 60° specular gloss tests. The polyoxyalkylene emulsifiers used in the succeeding examples are preferred because the emulsions prepared therewith contain a complete absence of grits and such other inhomogeneities as would adversely affect the film clarity and gloss.

To further illustrate the preparation of the particular type vinyl acetate polymer emulsion suitable for the present admixtures, an emulsion was prepared as described in Example 3 below.

EXAMPLE 3

The vinyl acetate polymer emulsion was prepared having the following charge.

Initial charge: Parts
    Water _____ 34.36
    Emulsifier (solid block copolymer of ethylene oxide-propylene oxide) _____ 0.70
    Auxiliary emulsifier (65% aqueous solution of alkylaryl sodium sulfonate) _____ 0.36
    Buffer (sodium bicarbonate) _____ 0.13
    Initiator (potassium persulfate) _____ 0.10
    Monomer (vinyl acetate) _____ 0.51
Delayed addition: Components of the initial charge—
    Emulsifier (22% aqueous solution of solid block copolymer of ethylene oxide-propylene oxide) _____ 12.80
    Monomer (vinyl acetate) _____ 50.52
    Terminal initiator (4% aqueous solution of potassium persulfate) _____ 0.52
                                                    ———
                                                    100.00

The polymerization process was commenced by dispersing the initial monomer with agitation in a solution comprising the other constituents listed in the initial charge above. The batch was heated to 70° C. with continued agitation, whereupon successive amounts of the delayed monomer were added at a rate which maintained the batch at reflux. After 10% of the delayed monomer had been charged into the batch, the delayed emulsifier solution was added in successive portions so that all the emulsifier had already been added when 50% of the monomer had already been charged into the batch. The dilute solution of terminal initiator was slowly introduced into the polymerization mixture after the last of the delayed monomer had been added. The temperature of the batch was then slowly raised to 90–95° C. Moderate agitation was continued throughout the polymerization process which was substantially complete in 3–3½ hours.

A stable polymer emulsion was formed by the above method having a 55.1% total solids concentration and an average resin particle size of 0.1–0.15 micron diameter. Films cast from the emulsion had excellent gloss, clarity, flexibility and water resistance.

Suitable ketone-aldehyde resins for the present admixtures may be selected from the broad class of ketone-aldehyde condensation polymers which are hard, practically colorless, and water-insoluble solids at ordinary temperature. Further, these polymers must be soluble in liquids miscible with water. The ring and ball melting points of the polymers should be in the range 90–110° C. in order to obtain the proper film hardness and gloss as well as workable viscosities needed for compounding the liquid surface coating compositions.

Ketone-aldehyde resins having the above mentioned characteristics can be prepared by condensing one mol of particular ketones with 2–6 mols of the aldehyde, preferably formaldehyde. The selection of ketones is important in order to obtain a practically colorless polymer and suitable ketones may be selected from the class consisting of methyl ethyl ketone, diethyl ketone, methyl isobutyl ketone and cyclohexanone. The mol ratio of the aldehyde to the ketone is preferably up to 3 in order to insure adequate solubility of the polymer in organic liquids.

The preparation of a suitable ketone-aldehyde resin is illustrated in Example 4 below.

EXAMPLE 4

Into a two liter resin flask equipped with a thermometer, dropping funnel, condenser and stirrer was added 324 grams of methyl ethyl ketone, 1014 grams of a 42% aqueous formaldehyde solution and several drops of a phenolphthalein indicator solution. To the clear, pale yellow solution at about 40° C., was added 10–30 milliters of a catalyst solution comprising 50 grams of sodium hydroxide dissolved in 250 milliters of water which was sufficient to give a pale pink color to the charge. Following a short induction period, reaction temperatures rose to 50–60° C., whereupon cooling water was applied in order to maintain the reaction temperature at about 75–80° C. The reaction was held at these temperatures for 30–40 minutes and maintained at pH 10 during this time by portion-wise addition of catalyst solution (5 milliters) until a total of 30–40 milliters of catalyst solution has been added.

Thereafter, additional catalyst was added dropwise until the total amount had been added, which operation took approximately 30–40 minutes. The reaction temperatures during this final catalyst addition was maintained at 85–95° C. by intermittent cooling. During the final catalyst addition, the reaction mass became suddenly cloudy with gradual further formation of a two liquid phase system. Following the addition of all the catalyst solution the charge was heated to reflux from one half to two hours, thereafter cooled to approximately 50° C. and the resin formed allowed to settle. The settled resin product was thereupon collected and washed with the collected washed product being a white, opaque amorphous solid at room temperature.

The selection of suitable solvents for the ketone-aldehyde resin used in the practice of the present invention is not critical and may be selected from the general class of organic liquids which are miscible with water. Useful solvents include alcohols, ketones, esters and glycols and more specifically methanol, isopropanol, ethylene glycol monoethyl ether acetate, ethylene glycol monoethyl ether, and ethylene glycol monomethyl ether. Ethylene glycol monoethyl ether is the preferred solvent because there is no lowering of gloss in the air-dried film accompanying its use, which does occur for the other named solvents. The use of solvents having low boiling points is not preferred for the reason that the loss of such solvents from the final coating composition due to vaporization quickly reduces the brushability of the coating composition.

As plasticizers there may be employed any of the available plasticizers for vinyl ester polymer emulsion, for example such organic compounds as phthalate esters, phosphate esters, chlorinated biphenyls and citrate esters.

Furthermore, useful organic compounds also include polymeric materials as for example, water dispersible liquid polyesters. In general, the suitable plasticizers may be selected from the class of water miscible organic plasticizer materials which are compatible with vinyl ester polymer emulsions. Dibutyl phtalate is the preferred plasticizer primarily because of its relatively lower viscosity compared to other suitable plasticizers, which lower viscosity aids in the incorporation of the plasticizer into the liquid coating composition. The concentration of plasticizers employed when desired in the aqueous coating composition is not critical and ranges from about 4–10% of the aqueous coating composition.

The useful pigments are characterized as being dispersible but not soluble in water and generally not chemically reactive with the other constituents in the composition. The optimum particle size of the pigment is 0.4 micron average diameter. When the pigment particle size exceeds approximately 2 microns diameter, there is difficulty in dispersing the pigment. Generally speaking, any of the normal pigments for vinyl ester polymer dispersion paints may be employed.

For paints it is usual to employ both pigments and extenders. Extenders which may be employed include calcium silicates, micas, particularly water ground mica, silicas, clays, talc and carbonates. The preferred extended materials are clays, micas, silicas and talcs. It is also preferred that the extenders as well as the pigments have the particle size above mentioned. The concentration of pigment and extenders therefor employed in the aqueous coating composition may not exceed 30% of the aqueous coating composition without materially losing some gloss in the dried coating.

The purpose of the surfactant in the present compositions is to first wet the pigment and extender, and secondly to disperse them in the liquid dispersion. Useful surfactants are those which are compatible with the vinyl acetate polymer emulsion. The selection of a suitable surfactant is not critical and the selection may be made from the group consisting of cationic, anionic and nonionic surface acting agents. The preferred surfactants are the anionic and nonionic type for the reason that certain of the cationic surfactants may precipitate the resin particles in the vinyl acetate polymer emulsion.

Useful thickeners can best be defined by their function in liquid coating composition which is to increase the viscosity of the water phase in the dispersion. Useful thickeners can be selected from the class of hydrophillic colloids generally, for example, Polyvinyl alcohol, methyl cellulose, carboxymethyl cellulose, hydroxyethyl cellulose, guar gum, methylated guar gum and other.

It is not intended to limit this invention to paints and varnishes merely. It is obvious, for example, that the unpigmented varnish compositions disclosed would make excellent adhesives where gloss and water resistance are important considerations. Likewise, by an increase of fillers, the pigmented compositions disclosed would make patching compounds, texture finishes, etc., having the improved properties stated. Still further, the incorporation of cement and other "hydraulic-setting" materials to the present compositions would result in improved architectural formulations, useful as caulking compounds, patching compounds etc.

What is claimed is:

1. A coating composition comprising the admixture, in parts by weight, of (A) an aqueous emulsion of a film forming vinyl acetate polymer in particles with a diameter ranging from 0.1 to 0.4 micron, said emulsion containing 100 parts vinyl acetate polymer formed by aqueous emulsion polymerization of 100 parts vinyl acetate in the presence of 3 to 15 parts of a polyalkylene glycol emulsifier selected from the group consisting of solid block copolymers of propylene oxide and ethylene oxide and of ethylene oxide homopolymers, with (B) a water miscible organic liquid solution of 3 to 300 parts of a water insoluble ketone-aldehyde resin having a ring and ball melting point of 90 to 110° C., said resin being the condensate of formaldehyde with a ketone selected from the group consisting of methyl ethyl, diethyl, methyl isobutyl ketones and cyclohexanone; the total polymeric solids constituting from about 30 to 65% by weight of said admixture.

2. An admixture as in claim 1 wherein the organic solvent is present in the ratio of 100 parts, in parts by weight, for 50 to 300 parts of the total amount of vinyl acetate polymer and ketone-aldehyde resin.

3. An admixture as in claim 1 wherein the ketone-aldehyde resin is the condensate of 1 mol methyl ethyl ketone with 2–6 mols formaldehyde, prepared under strongly alkaline conditions.

4. An admixture as in claim 1 wherein the weight ratio of vinyl acetate polymer to ketone-aldephyde resin is 100:50–150.

5. A process for the prepartion of the composition of claim 1 comprising the addition of the organic liquid solution to the aqueous emulsion with agitation at temperatures of up to 75° C. and the subsequent addition of pigment.

References Cited in the file of this patent

UNITED STATES PATENTS

| | | |
|---|---|---|
| 2,859,192 | Harvey et al. | Nov. 4, 1958 |
| 2,956,973 | Holdsworth | Oct. 18, 1960 |